May 28, 1929.   P. S. DOUGLAS   1,714,856
VALVE LOCKING DEVICE
Filed Dec. 19, 1927
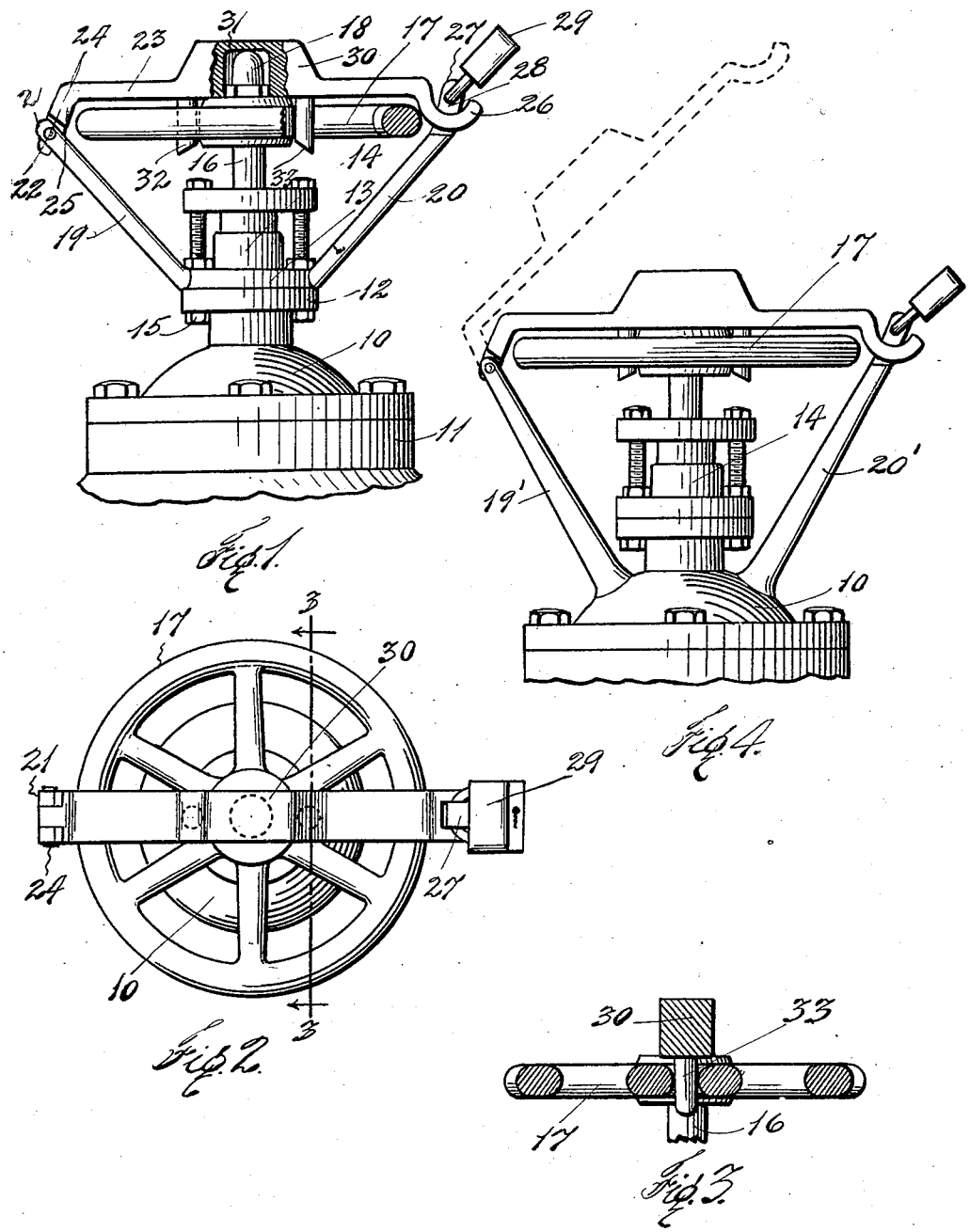
INVENTOR
P. S. Douglas
BY Jack A Ashley
ATTORNEY Patented May 28, 1929.

1,714,856

UNITED STATES PATENT OFFICE.

PAISLEY S. DOUGLAS, OF DALLAS COUNTY, TEXAS, ASSIGNOR OF ONE-HALF TO W. E. ROBINSON AND ONE-FOURTH TO G. R. DOUGLAS, BOTH OF DALLAS, TEXAS.

VALVE-LOCKING DEVICE.

Application filed December 19, 1927. Serial No. 241,039.

This invention relates to new and useful improvements in valve locking devices.

The invention has to do with devices for locking valves either open or closed or partially so and particularly to the fastening of the hand wheel or equivalent member against operation.

One object of the invention is to provide a device which may be detachably or permanently secured to a valve casing and locked in engagement with the hand wheel, whereby said wheel is secured against rotation, thus preventing manipulation of the valve stem.

A further object of the invention is to provide a device which will also cover the cap nut which holds the hand wheel on the valve stem and thereby prevent tampering with said nut.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is an elevation of the upper portion of a gate valve equipped with a locking device constructed in accordance with the invention, partions also being in section, Fig. 2 is a plan view of the same, Fig. 3 is a cross-sectional view on the line 3—3 of Fig. 2, and, Fig. 4 is an elevation showing another form of the invention, the locking bar being shown elevated in dotted lines.

In the drawings the numeral 10 designates the bonnet of a gate valve 11. It is the usual practice to provide such bonnets with a flange 12 to which the flange 13 of a stuffing box 14 is secured by bolts 15. The usual valve stem 16 extends upwardly from the stuffing box and a hand wheel 17 is fastened on the stem by a cap nut 18. Valves of this type are in common use in pipe lines which conduct oil from the oil fields, but it is to be understood the invention is not to be limited to such valves or to such use.

In the practice to fasten the hand wheels by means of a lock and chain, but this leaves the cap nut exposed so that one only has to remove the cap nut, lift off the wheel and turn the stem with a wrench.

In order to apply the locking device to valves which are already installed, the same may be secured to the box 14. This may be done by welding or otherwise securing the device to the said box and substituting these parts for the box on the valve, the removed box being used in assembling another device. I have found it practical to form a supporting yoke by attaching the lower ends of upwardly inclined arms 19 and 20, respectively, to diametrically opposite sides of the flange 13 of the box 14.

It is obvious that these arms may be given any suitable inclination and may vary in height; however, they must extend beyond the rim of the wheel 17, as is shown in Fig. 1. The upper end of the arm 19 is provided with ears 21 for receiving the ear 22 of the cap bar 23. The ears are connected by a hinge pin 24, whereby the bar 23 is hinged to the arm 19 adjacent one side of the wheel 17. The major portion of the bar is horizontal having a depending lug 25 at one end to which the ear 22 is attached.

At the opposite end of the bar a downwardly curved hasp 26 is provided. This hasp receives a reduced tongue 27 on the upper end of the arm 20 and said tongue is provided with an aperture 28 for receiving a padlock 29 whereby the cap bar is secured in place. It is obvious that any means of locking the member 23 to the arm 20 could be used.

An important feature is a boss or cap 30 provided in the center of the bar 23 and having a recess or cavity 31 in its underside for receiving the cap nut 18 so that when the bar is fastened the nut is covered and concealed. To prevent rotation of the hand wheel 17 the bar 23 is provided with a pair of depending pins 32 engaging between the spokes of the wheel on opposite sides of the head thereof. The lower ends of these pins are inwardly bevelled at 33 so as to facilitate the entry of said pins between the spokes when the cap bar is swung. It is important that these pins come as close as possible to the hub of the wheel and the bevelled ends are important so as to permit the pins to clear the wheel when the bar is swung.

It is obvious that with the pins engaging between the spokes the wheel can not be rotated. It is important that the cap 30 adequately cover the nut 18 and the lock 29 will prevent sufficient lifting of the bar 23 to give access to said nut.

In Fig. 4 I have shown another form in which arms 19' and 20', similar to the arms 19 and 20, are made integral with the bonnet 10. This form is used when the device is applied to a new valve during the manufacture of the same or to the manufacture of a new bonnet to be placed on an old valve case.

Various changes in the size and shape of the different parts, as well as modifications and alterations, may be made within the scope of the appended claims.

What I claim, is:

1. In a valve locking device, an attaching yoke comprising opposite upright arms extended beyond the periphery of the hand wheel of a valve, a rectilinear cap bar pivoted at one end to one arm and having a locking connection with the other arm of the yoke, and a depending projection from said bar at one side of its longitudinal center for engaging between the spokes of said hand wheel.

2. In a locking device for a hand wheel, an attaching yoke provided with oppositely inclined arms extended from below the hub of the wheel outwardly beyond the periphery thereof, a cap bar extending parallel to and above the wheel in contact with its hub and pivoted at one end to one arm and having its opposite end removably connected to the other arm, and a pair of alined pins depending from the bar and having their lower faces beveled radially outward from the wheel hub to closely fit over the hub and engage between the spokes of said hand wheel.

In testimony whereof I affix my signature.

PAISLEY S. DOUGLAS.